US005498701A

United States Patent [19]
Pedrazzi

[11] Patent Number: 5,498,701
[45] Date of Patent: Mar. 12, 1996

[54] BASIC DISAZO COMPOUNDS CONTAINING SULPHONIC ACID GROUPS

[75] Inventor: Reinhard Pedrazzi, Allschwil, Switzerland

[73] Assignee: Sandoz Ltd., Basel, Switzerland

[21] Appl. No.: 363,672

[22] Filed: Dec. 22, 1994

Related U.S. Application Data

[63] Continuation of Ser. No. 60,386, May 11, 1993, abandoned.

[30] Foreign Application Priority Data

May 13, 1992 [DE] Germany .......................... 42 15 679.3

[51] Int. Cl.[6] ...................... C09B 35/037; C09B 35/029; C09B 67/34; D21H 21/28
[52] U.S. Cl. .......................... 534/797; 534/604; 534/605; 8/437; 8/527; 8/658; 8/919
[58] Field of Search .................... 534/604, 605, 534/797; 8/437, 527, 919

[56] References Cited

U.S. PATENT DOCUMENTS

| | | | |
|---|---|---|---|
| 4,367,172 | 1/1983 | Pedrazzi | 534/797 |
| 4,544,737 | 10/1985 | Stohr et al. | 534/604 X |
| 4,670,546 | 6/1987 | Dore et al. | 534/612 |
| 4,742,160 | 5/1988 | Dore et al. | 534/605 |

FOREIGN PATENT DOCUMENTS 3133568  3/1983  Germany .

Primary Examiner—Johann Richter
Assistant Examiner—Fiona T. Powers
Attorney, Agent, or Firm—Robert S. Honor; Carl W. Battle; Carol A. Loeschorn

[57] ABSTRACT

Basic sulpho group-containing disazo compounds which are metal-free, correspond to the formula

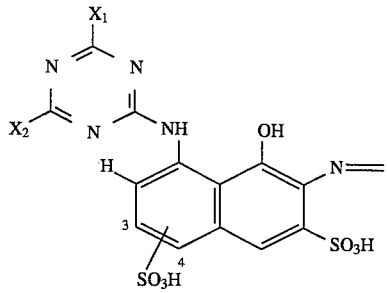

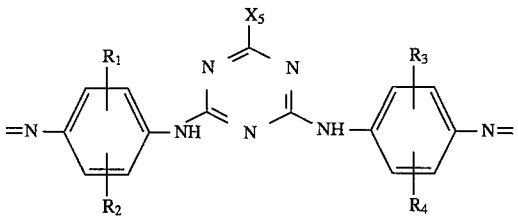

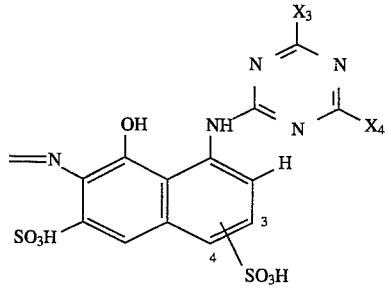

in which the symbols are as defined in claim 1. These compounds, in form of their water-soluble salts, and preparations thereof are used for dyeing or printing cationically dyeable materials such as hydroxy group- or nitrogen-containing organic substrates of which textile material comprising natural or synthetic polyamide or natural or regenerated cellulose and especially cotton, leather and paper are preferred. Furthermore, they can be used for the preparation of inks in a conventional manner.

15 Claims, No Drawings

BASIC DISAZO COMPOUNDS CONTAINING SULPHONIC ACID GROUPS

This is a continuation of application Ser. No. 08/060,386, filed May 11, 1993, now abandoned.

The invention relates to basic sulpho group-containing disazo compounds which are metal-free, and their salts and to a process for the preparation and their use as dyestuffs as well as dyeing preparations thereof.

More particularly, the invention provides compounds of formula I

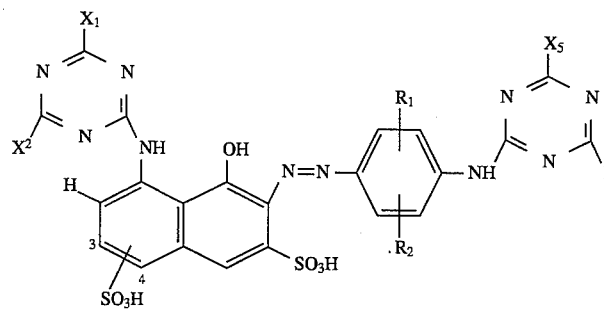
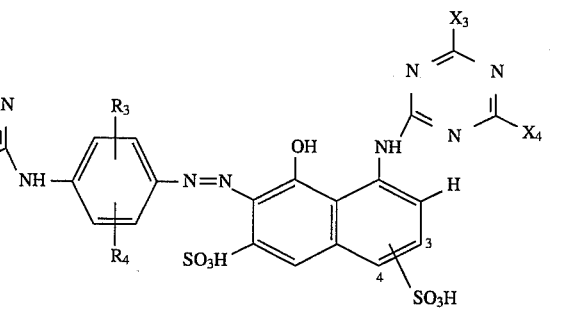

or internal and/or external salts thereof, in which each of $R_1$ to $R_4$ is independently hydrogen, halogen, hydroxy, $C_{1-4}$alkyl, $C_{1-4}$alkoxy, —NHCOC$_{1-4}$alkyl or —NHCONH$_2$, each of $X_1$ to $X_4$ is independently an aliphatic, cycloaliphatic or heterocyclic amino group containing at least two nitrogen atoms, with the proviso that each of these amino groups bears a protonatable nitrogen atom or quaternary ammonium ion, and at least one of these amino groups bears a primary amino group, and $X_5$ is an aliphatic, cycloaliphatic or heterocyclic amino group containing at least two nitrogen atoms one of which is a protonatable nitrogen atom or quaternary ammonium ion, or an aromatic diamino group of which the terminal amino group is substituted by

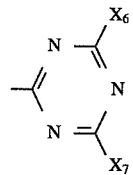

in which each $X_6$ and $X_7$ is independently an aliphatic, cycloaliphatic or heterocyclic amino group which contains at least two nitrogen atoms one of which is a protonatable nitrogen atom or a quaternary ammonium ion, with the proviso that the sum of the protonatable amino groups and quaternary ammonium groups present in $X_1$ to $X_5$ exceeds the number of sulpho groups by at least one.

The number of $X_1$ to $X_5$ containing a primary amino group is preferably 2 to 4; more preferably, $X_5$ does not contain a primary amino group.

Preferably in the benzene rings, $R_1$ and $R_2$ and also $R_3$ and $R_4$ are para to each other as indicated below:

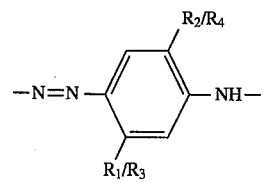

In this formula each $R_1$ and $R_3$ is preferably $R_{1a}$ and $R_{3a}$, where each $R_{1a}$, and $R_{3a}$, is independently hydrogen, methyl, methoxy, —NHCOCH$_3$ or —NHCONH$_2$; and each $R_2$ and $R_4$ is preferably $R_{2a}$ and $R_{4a}$ where each $R_{2a}$ and $R_{4a}$ is independently hydrogen, methyl or methoxy. More preferably each $R_1$ and $R_3$ is $R_{1b}$ and $R_{3b}$, where $R_{1b}$ and $R_{3b}$ is independently hydrogen, methyl or methoxy, and each $R_2$ and $R_4$ is hydrogen. Most preferably, each of $R_1$ to $R_4$ is hydrogen.

The floating sulphonic acid group in both naphthyl rings is preferably in the 3-position.

Each of $X_1$ to $X_7$ defined as an amino group is preferably a radical

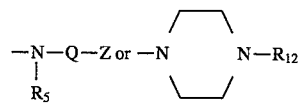

in which $R_5$ is hydrogen or $C_{1-4}$alkyl,

Q is $C_{2-6}$alkylene, $C_{3-6}$alkylene substituted by one or two hydroxy groups, or $C_{4-6}$alkylene which is interrupted by —O—, —S— or —N(R$_5$)—, and Z is —NR$_6$R$_7$ or —⊕NR$_8$R$_9$R$_{10}$ in which each $R_6$ and $R_7$ is independently hydrogen; $C_{1-6}$alkyl; $C_{2-6}$alkyl monosubstituted by hydroxy, $C_{1-4}$alkoxy or cyano; phenyl; phenyl substituted by one to three substituents selected from halogen, $C_{1-4}$alkyl and $C_{1-4}$alkoxy; phenyl($C_{1-4}$alkyl); phenyl($C_{1-4}$alkyl) the phenyl ring of which is substituted by one to three substituents selected from halogen, $C_{1-4}$alkyl and $C_{1-4}$alkoxy; $C_{5-6}$cycloalkyl or $C_{5-6}$cycloalkyl substituted by one to three $C_{1-4}$alkyl groups; or —NR$_6$R$_7$ forms a pyrrolidine-, piperidine- or morpholine ring or a ring

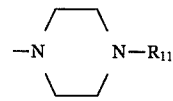

in which $R_{11}$ is hydrogen, $C_{1-4}$alkyl or $C_{2-4}$alkyl monosubstituted by hydroxy or amino, each $R_8$ and $R_9$ is independently $C_{1-6}$alkyl; $C_{2-6}$alkyl monosubstituted by hydroxy, $C_{1-4}$alkoxy or cyano; phenyl; phenyl substituted by one to three substituents selected from halogen, $C_{1-4}$alkyl and $C_{1-4}$alkoxy; phenyl($C_{1-4}$alkyl); phenyl($C_{1-4}$alkyl) the phenyl ring of which is substituted by one to three substituents selected from halogen, $C_{1-4}$alkyl and $C_{1-4}$alkoxy; $C_{5-6}$cycloalkyl or $C_{5-6}$cycloalkyl substituted by one to three $C_{1-4}$alkyl groups, and $R_{10}$ is $C_{1-4}$alkyl or benzyl, or —⊕$NR_8R_9R_{10}$ forms a ring $$-\overset{\oplus}{\underset{R_{10}}{N}}\diagup\diagdown \quad \text{or} \quad -\overset{\oplus}{\underset{R_{10}}{N}}\diagup\diagdown U$$

in which U is —$CH_2$—, —O— or —$N(R_{11})$—, or a pyridinium group which is unsubstituted or substituted by one or two methyl groups, with the proviso that the positive charge of each —⊕$NR_8R_9R_{10}$ is independently balanced by the negative charge of $SO_3^{\ominus}$ in the compounds of formula I to form an internal salt or by $An^{\ominus}$ which is an external non-chromophoric anion, and $R_{12}$ is $C_{2-4}$alkyl monosubstituted by amino or hydroxy.

In the specification, any halogen is preferably fluorine, chlorine or bromine, more preferably, it is chlorine or bromine, and especially chlorine.

Any alkyl or alkylene group present is linear or branched unless indicated otherwise. In any hydroxy- or alkoxy-substituted alkyl or alkylene group which is attached to a nitrogen atom, the hydroxy or alkoxy group is preferably bound to a carbon atom which is not directly bound to this nitrogen atom. If any alkylene group is substituted by two hydroxy groups, these hydroxy groups are preferably bound to different carbon atoms which in addition are preferably not adjacent carbon atoms. In any alkylene chain interrupted by —O—, —S— or —$N(R_5)$— which is bound to a nitrogen atom, preferably —O—, —S— or —$N(R_5)$— is bound to a carbon atom which is not directly attached to this nitrogen atom.

$R_5$ is preferably $R_{5a}$, where $R_5$, is hydrogen or methyl.

Any linear alkylene as Q is preferably —$(CH_2)_n$— in which n is 2 or 3; any hydroxy-substituted alkylene as Q is preferably $$-CH_2\underset{OH}{\overset{|}{C}H}CH_2-.$$

Any branched alkylene as Q is preferably $$-\overset{*}{C}H\underset{CH_3}{\overset{|}{}}CH_2-, \quad -\overset{*}{C}H_2\underset{CH_3}{\overset{|}{C}}H-, \quad -CH_2\underset{CH_3}{\overset{|}{C}}HCH_2-,$$

$$-\overset{*}{C}H\underset{C_2H_5}{\overset{|}{}}CH_2- \quad \text{or} \quad -\overset{*}{C}H_2\underset{C_2H_5}{\overset{|}{C}}H-$$

in which the marked carbon atom is attached to —$N(R_5)$—.

If the alkylene group is interrupted by a hetero atom, it is preferably —$(CH_2)_n$—Y—$(CH_2)_n$— in which n is 2 or 3 and Y is —O— or —$N(R_{5a})$—.

Q is preferably $Q_a$, where $Q_a$ is $C_{2-4}$alkylene, monohydroxy-substituted $C_{3-4}$alkylene or —$(CH_2)_n$—Y—$(CH_2)_n$—; more preferably $Q_b$, where $Q_b$ is $$-\overset{*}{C}H_2\underset{CH_3}{\overset{|}{C}}H-$$

or -$(CH_2)_2$—NH—$(CH_2)_2$—; most preferably it is $Q_c$, where $Q_c$ is —$(CH_2)_n$— or $$-\overset{*}{C}H_2\underset{CH_3}{\overset{|}{C}}H-$$

in which n and Y are as defined above, and each marked carbon atom is bound to —$N(R_5)$—.

$R_6$ and $R_7$ are preferably $R_{6a}$ and $R_{7a}$ where each $R_{6a}$ and $R_{7a}$ is independently hydrogen, $C_{1-4}$alkyl, $C_{2-3}$hydroxyalkyl or benzyl, or —$NR_{6a}R_{7a}$ is piperidino, morpholino or $$-N\diagup\diagdown N-R_{11a}$$

in which $R_{11a}$ is hydrogen, methyl, 2-hydroxyethyl or 2-aminoethyl. More preferably, they are $R_{6b}$ and $R_{7b}$, where $R_{6b}$ and $R_{7b}$ are the same and are hydrogen, methyl, ethyl or 2-hydroxyethyl, or —$NR_{6b}R_{7b}$ is piperidino, morpholino or $$-N\diagup\diagdown N-R_{11a}.$$

Most preferably $R_6$ and $R_7$ are $R_{6c}$ and $R_{7c}$, where $R_{6c}$ and $R_{7c}$ are the same and are hydrogen, methyl or ethyl.

$R_8$ and $R_9$ are preferably $R_{8a}$ and $R_{9a}$, where each $R_{5a}$ and $R_{9a}$ is methyl or ethyl, preferably $R_{8a}$ and $R_{9a}$ are the same; $R_{10}$ is preferably $R_{10a}$, where $R_{10a}$ is methyl, ethyl or benzyl; or —⊕$NR_{8a}R_{9a}R_{10a}$ is a pyridinium group which is unsubstituted or substituted by one or two methyl groups.

Z is preferably $Z_a$, where $Z_a$ is —$NR_{8a}R_{7a}$ or —⊕$NR_{8a}R_{9a}R_{10a}$; more preferably, it is $Z_b$, where $Z_b$ is —$NR_{6b}R_{7b}$ or —⊕$NR_{8a}R_{9a}R_{10a}$; most preferably it is $Z_c$, where $Z_c$ is —$NR_{6c}R_{7c}$.

$X_1$ to $X_4$ are preferably $X_{1a}$ to $X_{4a}$, where each of $X_{1a}$ to $X_{4a}$, is independently $$-\underset{R_{5a}}{\overset{|}{N}}-Q_a-Z_a \quad \text{or} \quad -N\diagup\diagdown N-CH_2CH_2NH_2;$$

more preferably they are $X_{1b}$ to $X_{4b}$, where each of $X_{1b}$ to $X_{4b}$ is independently —NH—$Q_b$—$Z_b$ or $$-N\diagup\diagdown N-CH_2CH_2NH_2;$$

even more preferably they are $X_{1c}$ to $X_{4c}$, where each of $X_{1c}$ to $X_{4c}$ is independently —NH—$Q_cZ_c$ or $$-N\diagup\diagdown N-CH_2CH_2NH_2.$$

most preferably, $X_1$ to $X_4$ are $X_{1d}$ to $X_{4d}$, where each of $X_{1d}$ to $X_{4d}$ is independently —NH—$(CH_2)_n$—$NR_{6d}R_{7d}$,

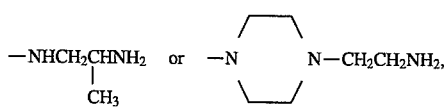 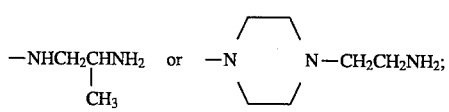

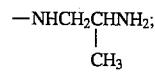

(3) those of (2) in which at least two of $X_{1d}$ to $X_{4d}$ are $$-NHCH_2\underset{\underset{CH_3}{|}}{C}HNH_2;$$

(4) $X_{5b}$ is $X_{5c}$;

(5) those of (1) to (4) in which $R_{1b}$ and $R_{3b}$ are both hydrogen.

Furthermore, preferred compounds of formula I and Ia are symmetrical, i.e. the two monoazo radicals connected by the triazinylamino bridge are identical.

If an external anion An⊖ is present to balance the positive charge of a quaternary ammonium ion defined for $X_1$ to $X_5$, it can be any non-chromophoric organic or inorganic anions such as those conventional in the field of basic dyestuff chemistry. Suitable anions include chloride, bromide, lactate, acetate, propionate, citrate, oxalate, malate, maleate, succinate, methyl sulphate, ethyl sulphate and hydrogen sulphate.

The sulphonic acid groups of the compounds of formula I are normally ionised and are present as $SO_3\ominus$. They form either internal salts with the basic amino groups or cationic ammonium groups $X_1$ to $X_5$, or external salts under alkaline conditions. Suitable external cations to balance the negative charge of $SO_3\ominus$ are any non-chromophoric cations such as alkali metal ions, e.g. of lithium, sodium and potassium, or any unsubstituted or substituted ammonium ions.

Those amino or ammonium groups which do not participate in internal salts are capable to form external salts, such as acid addition salts or quaternary ammonium salts, when reacted with appropriate acids. Suitable acids are dilute mineral acids such as hydrochloric acid, sulphuric acid and phosphoric acid, or preferably organic acids such as formic acid, acetic acid, methoxy acetic acid, lactic acid, citric acid, glycolic acid and methane sulphonic acid.

The compounds of formula I according to the invention can be prepared by reacting a compound of formula II in which n is 2 or 3 and $R_{6d}$ and $R_{7d}$ are methyl or ethyl and are the same. $X_5$ is preferably $X_{5a}$, where $X_{5a}$ is

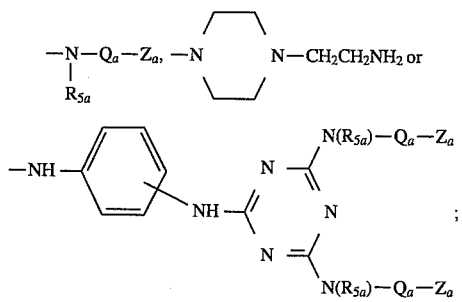

or more preferably, it is $X_{5b}$, where $X_{5b}$ is —NH—$(CH_2)_nZ_b'$ in which n is 2 or 3 and $Z_b'$ has one of the significances of $Z_b$ but independent thereof, with the exception of —NH$_2$; most preferably, $X_5$ is $X_{5c}$, where $X_{5c}$ is —NH—$(CH_2)_n$—$NR_{6d}R_{7d}$ wherein n, $R_{6d}$ and $R_{7d}$ are as defined above.

Preferred compounds of formula I correspond to formula Ia,

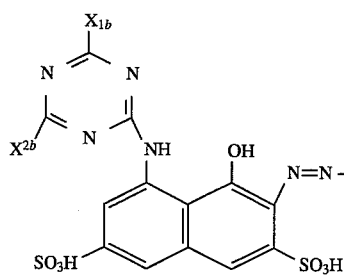 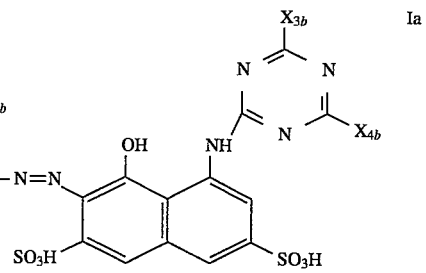

in which $R_{1b}$, $R_{3b}$ and $X_{1b}$ to $X_{5b}$ are as defined above, with the proviso that at least two of $X_{1b}$ to $X_{4b}$ are independently

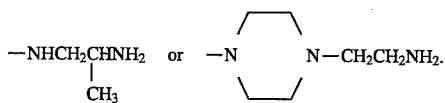

More preferred are compounds of formula Ia in which (1) $X_{1b}$ to $X_{4b}$ are $X_{1c}$ to $X_{4c}$, with the proviso that at least two of $X_{1c}$ to $X_{4c}$ are independently

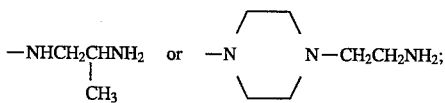

(2) $X_{1b}$ to $X_{4b}$ are $X_{1d}$ to $X_{4d}$, with the proviso that at least two of $X_{1d}$ to $X_{4d}$ are independently

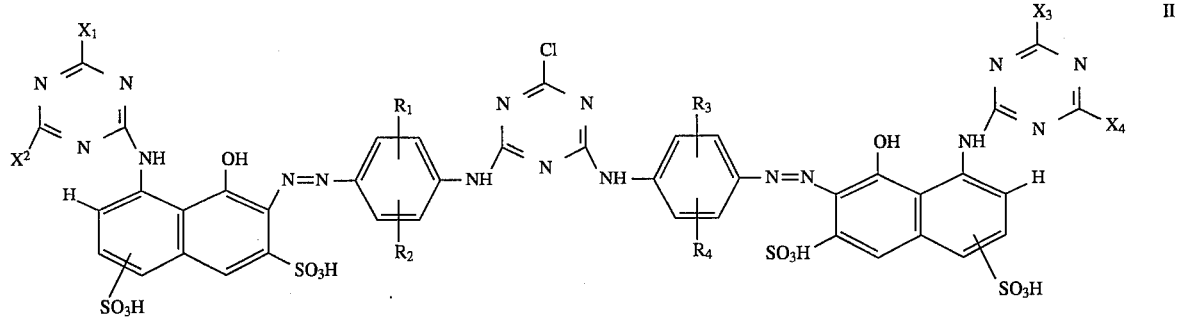

with an amine of formula $X_5$—H in which $R_1$ to $R_4$ and $X_1$ to $X_5$ are as defined above.

Those compounds of formula I in which $X_1$ is identical to $X_3$ and $X_2$ is identical to $X_4$ and the floating sulphonic acid group in the naphthyl radicals is either in the 3- or in the 4-position, may be prepared by diazotising one mole of a compound of formula III

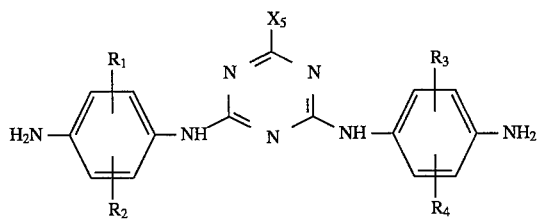

on both sides and reacting with at least two moles of a compound of formula IV

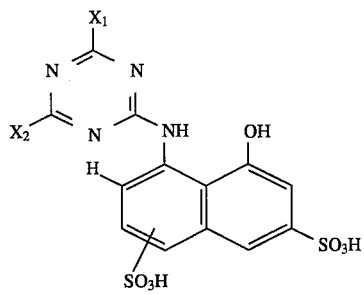

in which $R_1$ to $R_4$, $X_1$, $X_2$ and $X_5$ are as defined above.

Condensation of a compound of formula II with an amine $X_5$—H is suitably carried out at a temperature of about 95° C. Diazotisation of a compound of formula III and also the coupling reaction with a compound of formula IV can be carried out according to known methods; coupling is preferably effected at a pH of 6 to 8.

The compounds of formula I may be isolated in accordance with conventional methods, for example by precipitating the compound of formula I from the reaction solution, filtering off and drying. By the addition of an appropriate acid, the resultant compound of formula I can also be obtained in form of a solution which is ready to use.

The starting compounds of formulae II, III and IV and also the amines $X_5$—H are either known or may be prepared in accordance with known methods using known starting materials, i.e. by corresponding condensation and coupling reactions, starting with cyanuric chloride in which the stepwise exchange of the chlorine atoms on the triazine ring is effected in a manner known per se and takes place under conditions which are conventional for the exchange of the first (at a temperature of about 0° to 5° C.), second (at a temperature of about 40° to 60° C.) and third (at a temperature of about 95° C.) chlorine atom on the triazine ring.

The compounds of formula I in form of their internal/acid addition or quaternary ammonium salts can be used as dyestuffs for dyeing or printing cationically dyeable materials such as single or mixed polymers of acrylonitrile, acid-modified polyester fibres; leather, cotton, bast fibres such as hemp, flax, sisal, jute, coir fibres and straw; regenerated cellulose fibres, glass fibres and paper.

The compounds according to the invention, in water-soluble salt form, are preferably used for dyeing or printing hydroxy group- or nitrogen-containing organic substrates. For example, they can be used for dyeing or printing fibres, filaments or textiles produced therefrom which comprise natural or synthetic polyamide or natural or regenerated cellulose material, e.g., cotton, according to known methods. Cotton is preferably dyed by the conventional exhaust process, for example from a long or short liquor and at room temperature to boiling temperature. Printing is effected by impregnation with a printing paste which is prepared by known methods.

The new compounds can also be employed for dyeing or printing leather, preferably chrome-tanned types of leather, by known methods.

In addition, they may be used in the production of inks according to known methods.

The compounds of formula I are especially suited for dyeing or printing paper, e.g. for the production of mass-dyed, sized or unsized paper. They can also be used for dyeing paper by the dipping process or in the sizing press. Dyeing and printing take place by known methods.

The dyeings and prints obtained, especially those on paper, show good fastness to use properties.

The compounds of formula I may also be used in the form of dyeing preparations. This form of application is preferred in particular when dyeing paper. The processing into stable liquid, preferably aqueous, concentrated dyeing preparations may be effected in accordance with known methods, advantageously by dissolving in suitable solvents, optionally in the presence of an adjuvant, e.g. a hydrotropic compound or a stabiliser. Of particular advantage is the possibility of producing such stable aqueous-concentrated preparations in the course of the dyestuff synthesis without any intermediary isolation of the dyestuff.

A suitable composition of a liquid preparation is as follows (parts are by weight):

100 parts of a compound of formula I in acid addition or quaternary ammonium salt form, 0–10, preferably 0–1, parts of an inorganic salt, 100–800 parts of water, and 0–500 parts of a solubilising agent (for example glycols such as ethylene glycol, propylene glycol, diethylene glycol, tri-ethylene glycol and hexylene glycol; glycol ethers such as methyl cellosolve, methyl carbitol and butyl polyglycol; urea; formamide and dimethylformamide).

These liquid aqueous dye preparations are stable and can be stored for a long time.

The compounds of formula I (in appropriate salt form) have good solubility properties, and are especially notable for their good solubility in cold water. Due to their high substantivity, the dyestuffs are absorbed practically quantitatively and show good build-up. When producing sized and unsized paper, the waste water is practically colourless or is only slightly coloured. The dyestuffs can be added to the paper pulp directly, i.e. without pre-dissolving, as a dry powder or in granules, without any reduction in brilliance or colour yield. When compared with unsized paper dyeings, the sized paper dyeings show no loss of depth. The compounds of formula I can also be used for dyeing in soft water where the full colour yield is obtained. They do not mottle when dyed on paper, they are not inclined to produce two-sided effects on paper and are substantially insensitive towards fillers and pH variations.

The dyeings on paper exhibit good light fastness; after a long-term exposure to light, the shade alters tone-in-tone. The dyed papers have a high level of fastness to bleeding. They show very good wet fastness properties not only to water, but also to milk, fruit juices, sweetened mineral water, soap water, tonic water, sodium chloride solution, and urine. In addition, they have good alcohol fastness. Paper which has been dyed with the compounds of formula I can be bleached both by oxidation and by reduction, which is important for the re-use of waste paper.

Fibrous materials containing mechanical wood pulp are dyed with the compounds according to the invention in a good and even quality.

Furthermore, the compounds of formula I are suitable for dyeing in combination. The dyeings which are obtained when compounds of formula I are used together with dyestuffs which exhibit comparable dyeing properties, have good fastness properties.

The following examples illustrate the invention. In the examples, all parts and percentages are by weight unless indicated to the contrary, and all temperatures are given in degrees celsius.

EXAMPLE 1

300 Parts by volume of an aqueous hydrochloric solution containing 0.0366 mole of the compound of formula (1a)

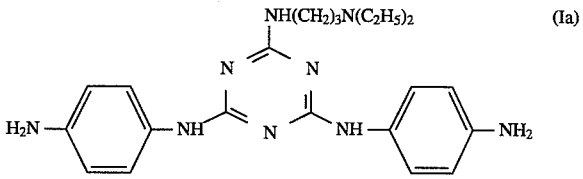
(1a)

are tetrazotised in accordance with known methods and are coupled at pH 6 with 43.6 parts (0.08 mole) of the compound of formula (1b)

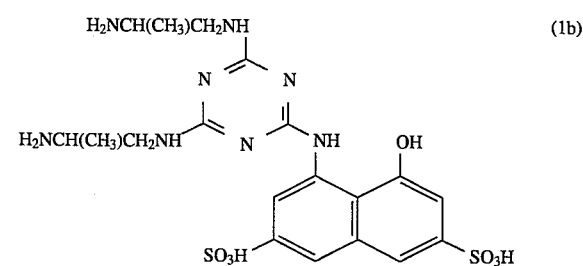
(1b)

The blue dyestuff which is formed precipitates and is filtered off. After drying, 60 parts of the dyestuff of formula (1c)

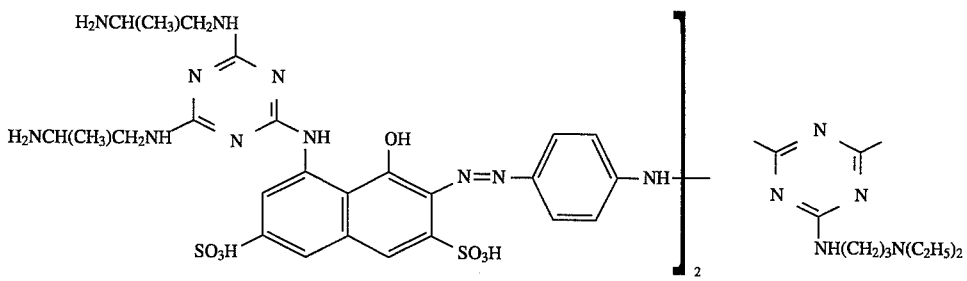
(1c)

are obtained which are stirred into 890 parts of demineralised water with the addition of 50 parts by volume of formic acid. A dye solution is obtained which is stable and ready to use which dyes paper a reddish blue shade. The waste water resulting from the dyeing is practically colourless. The wet- and light-fastness properties of the resultant paper dyeings are excellent.

The preparation of the starting compounds of formulae (1a) and (1b) may be effected in accordance with a method known per se.

Thus, the compound of formula (1a) can be prepared as follows:

a) 1 Mole of cyanuric chloride is stirred into a mixture of water and ice and 2 moles of 4-aminoacetanilide are added thereto. Condensation is carried out stepwise while starting at a temperature of 0°–10° which is gradually increased up to 60°. After the reaction is complete, 2 moles of diethylamino propylamine are added, and the temperature is raised to 90°–95°. When the third chlorine atom of the cyanuric chloride has been replaced, the acetyl protecting groups present are split off by acidic saponification resulting in the compound of formula (1a).

The compound of formula (1b) can be prepared as follows:

b) 2 Moles of 1,2-diaminopropane are stirred into a mixture of ice and water, and the pH of this mixture is adjusted at 3–5 by adding hydrochloric acid. 1 Mole of cyanuric chloride is then added, and the temperature is raised from 0° to 25°–30° within five hours. Simultaneously, the pH of the reaction mixture is kept at 5.5 by the addition of dilute sodium hydroxide solution. After the reaction is complete, 0.9 mole of 1-amino-8-hydroxynaphthalene-3, 6-disulphonic acid is added. The mixture is heated to 80°–90° while maintaining a pH of 2–3 by adding dilute sodium hydroxide solution. After one hour the reaction is completed by which the compound of formula (1b) is obtained.

When instead of using 2 moles of 1,2-diaminopropane in b), it is reacted with first 1 mole of diethylamino propylamine and then with 1 mole of 1,2-diaminopropane, a compound analogous to that of formula (1b) is obtained which contains two different amino groups on the triazinyl ring.

EXAMPLES 2 to 12

By analogy with the method described in Example 1 using appropriate starting compounds, further compounds of formula I can be prepared. They correspond to formula (A)

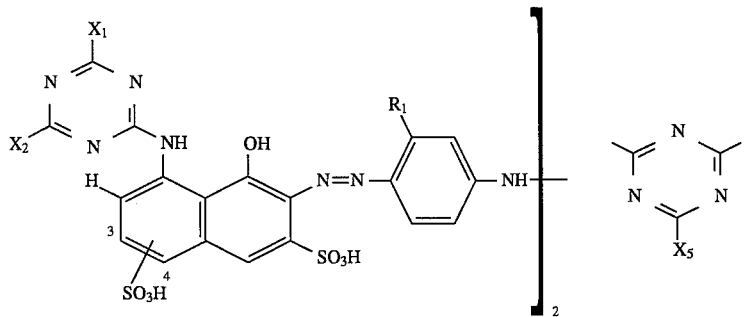

in which the symbols are as defined in the following Table 1.

The paper dyeings obtained with the dyes of Examples 2 to 12 are reddish blue and show good light- and wet-fastness properties.

In the Tables 1 and 2 below, the following radicals are used as a significance for $X_1$ to $X_5$:

—NH(CH$_2$)$_3$N(C$_2$H$_5$)$_2$    as $A_1$
—NH(CH$_2$)$_3$N(CH$_3$)$_2$    as $A_2$
—NH(CH$_2$)$_2$N(C$_2$H$_5$)$_2$    as $A_3$
—NH(CH$_2$)$_2$N(CH$_2$)$_2$    as $A_4$

—NHCH$_2$CHNH$_2$    as $B_1$
       |
       CH$_3$

—N⟨   ⟩N—CH$_2$CH$_2$NH$_2$    as $B_2$

TABLE 1

| | Compounds of formula (A) | | | | |
|---|---|---|---|---|---|
| Ex. No. | position of SO$_3$H | $R_1$ | $X_1$ | $X_2$ | $X_5$ |
| 2 | 3 | H | $B_1$ | $B_1$ | $A_2$ |
| 3 | 4 | H | $B_1$ | $B_1$ | $A_1$ |
| 4 | 3 | H | $B_1$ | $A_1$ | $A_1$ |
| 5 | 3 | H | $B_2$ | $B_2$ | $A_1$ |
| 6 | 3 | H | $B_2$ | $B_2$ | $A_2$ |

(A)

TABLE 1-continued

| | Compounds of formula (A) | | | | |
|---|---|---|---|---|---|
| Ex. No. | position of SO$_3$H | $R_1$ | $X_1$ | $X_2$ | $X_5$ |
| 7 | 3 | H | $B_1$ | $B_2$ | $A_1$ |
| 8 | 3 | H | $A_1$ | $B_2$ | $A_1$ |
| 9 | 4 | CH$_3$ | $B_1$ | $B_1$ | $A_1$ |
| 10 | 3 | " | $B_1$ | $B_1$ | $A_1$ |
| 11 | 3 | OCH$_3$ | $B_2$ | $B_2$ | $A_2$ |
| 12 | 3 | " | $A_3$ | $B_1$ | $A_4$ |

EXAMPLE 13

0.01 Mole of cyanuric chloride is reacted at 0°–50° with 0.01 mole of the compound of formula (13a)

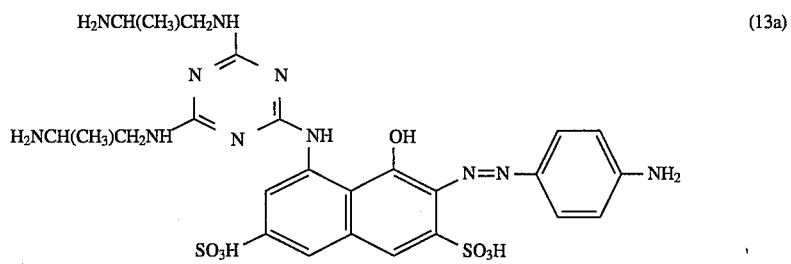

(13a)

and then at 40°–60° with 0.01 mole of the compound of formula (13b)

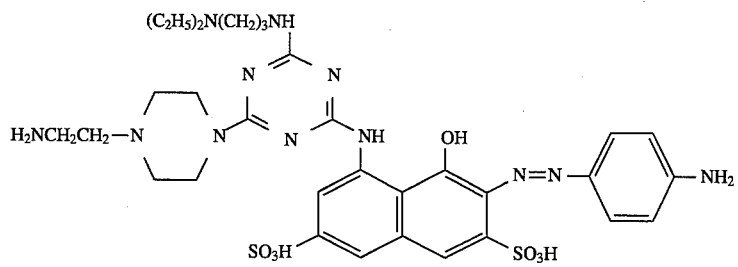
(13b)

Finally, the resultant condensation product is reacted with diethylamino propylamine at 95°. The dyestuff thus obtained has the formula (13c)

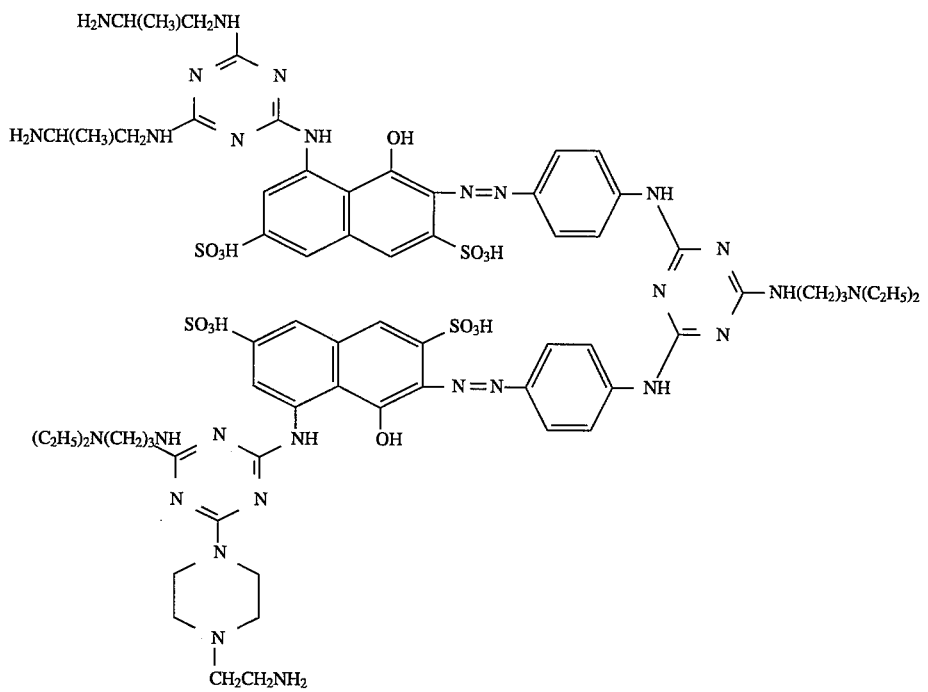
(13c)

and dyes paper a reddish blue shade. These paper dyeings show good light- and wet-fastness properties.

EXAMPLES 14 to 23

By analogy with the method described in Example 13 using appropriate starting materials, further compounds of formula I can be prepared which are listed in the following Table 2. They correspond to formula (B)

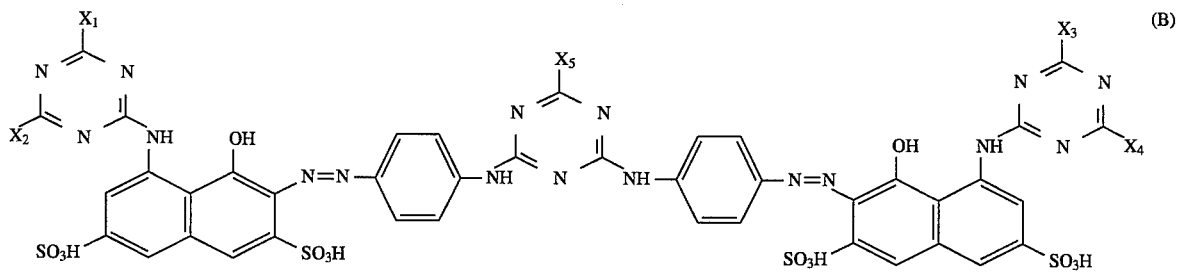
(B)

in which the symbols are as defined in Table 2 below.

The paper dyeings obtained with the compounds of Examples 14 to 23 show a blue shade and have good fastness properties.

TABLE 2

| Ex. No. | Compounds of formula (B) | | | | |
|---|---|---|---|---|---|
| | $X_1$ | $X_2$ | $X_3$ | $X_4$ | $X_5$ |
| 14 | $B_1$ | $B_1$ | $A_1$ | $B_1$ | $A_1$ |
| 15 | $B_2$ | $B_2$ | $B_2$ | $B_1$ | $A_1$ |
| 16 | $B_1$ | $B_1$ | $B_1$ | $B_2$ | $A_1$ |
| 17 | $B_1$ | $A_1$ | $A_1$ | $A_1$ | $A_1$ |
| 18 | $B_2$ | $A_1$ | $A_1$ | $A_1$ | $A_1$ |
| 19 | $B_2$ | $B_2$ | $A_1$ | $A_1$ | $A_1$ |
| 20 | $B_1$ | $B_1$ | $B_2$ | $B_2$ | $A_1$ |
| 21 | $B_1$ | $B_1$ | $A_1$ | $A_1$ | $A_1$ |
| 22 | $B_1$ | $B_2$ | $A_2$ | $A_2$ | $A_2$ |
| 23 | $B_1$ | $B_1$ | $A_3$ | $B_1$ | $A_3$ |

EXAMPLE 24

33.8 Parts of cyanuric chloride are stirred into a mixture of 150 parts of ice and 150 parts of water. Then 849 parts by volume of an aqueous hydrochloric solution containing 60.6 parts of the compound of formula (24a)

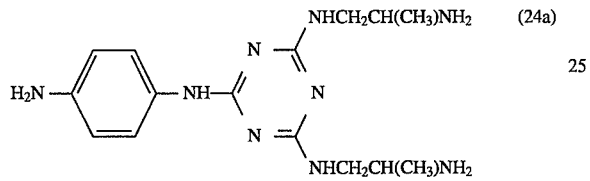

(24a)

are added thereto within 20 minutes at a pH of 4°–5 and at a temperature of 5°–150. When the condensation reaction has finished, 55 parts of 4-aminoacetanilide are added. The reaction mixture is heated to 95° and is kept at this temperature for two to three hours. During the reaction, a pH of 3.5 is maintained by adding sodium hydroxide solution. After this time less than 5% of the starting amount of 4-aminoacetanilide is detectable. Subsequently, 200 parts by volume of 30% hydrochloric acid solution are added, and stirring is effected for ten hours at 80°. By this treatment the acetyl protecting groups have been split off. The resultant solution is cooled to room temperature and then filtered clear. 1800 Parts by volume of a hydrochloric solution are obtained which contain 106 parts of the compound of formula (24b)

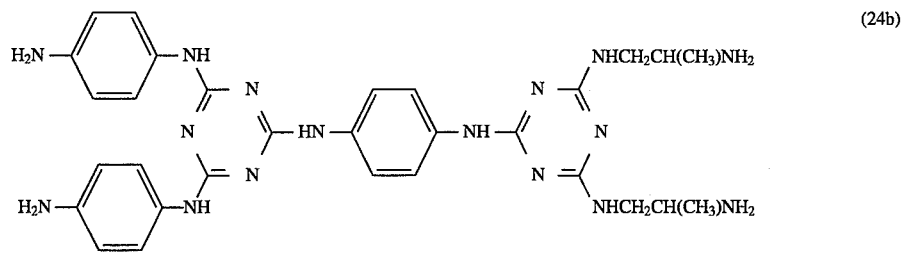

(24b)

216 Parts by volume of the above solution to which ice has been added, are tetrazotised with 11 parts by volume of 4N sodium nitrite solution. Then 12 parts of the compound of formula (1b) are added, and coupling is effected by adjusting to a pH of 6 first by the addition of sodium carbonate, and then to a clearly alkaline pH by adding sodium hydroxide solution. A dyestuff suspension is obtained which is filtered and washed with water. After drying 47 parts of a dark powder containing 31 parts of the dyestuff of formula (24c)

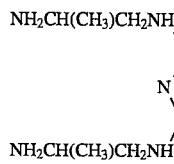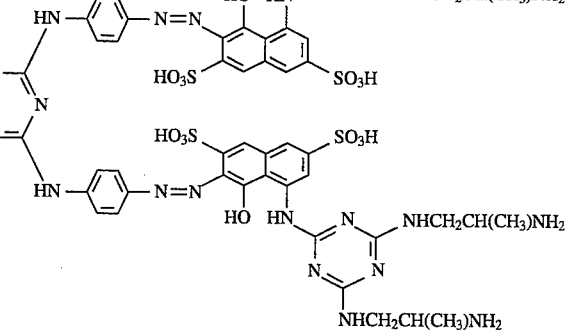

(24c)

are obtained. The dyestuff is well soluble in water when an acid, such as formic acid, acetic acid or lactic acid, is present, and dyes paper a reddish blue shade. These paper dyeings are perfect with respect to back-water colouration and wet fastness properties.

The compound of formula (24a) can be prepared as follows:

Moles of 1,2-diaminopropane are stirred in ice and water, and the resulting mixture is adjusted to a pH of 3–5 by adding hydrochloric acid solution. 1 Mole of cyanuric chloride is added thereto, and stirring is effected for five hours at a pH of 5.5. Subsequently, 1 mole of 4-aminoacetanilide is added and the temperature is raised to 70°, whilst maintaining a pH of 3–3.5 by adding dilute sodium hydroxide solution. After condensation has finished, 500 parts by volume of 30% hydrochloric acid solution are added, and the reaction mixture is stirred for a further time at 70°–75°. After two hours saponification is complete.

By a manner analogous to that described in Example 1, the dyestuffs of Examples 2 to 24 can also be converted into liquid stable and ready to use dye solutions when adding the appropriate amount of water and formic acid to each dyestuff.

Instead of using formic acid, any other organic acid such as lactic-, acetic- and methoxy acetic-acid or a mixture thereof including formic acid, can be used to form an acid addition salt of each dyestuff which is well soluble in water.

Examples of suitable applications for the dyestuffs hereinbefore described which are used as acid addition salt in solid form or as a liquid-aqueous ready to use dyeing preparation, are illustrated in the following Application Examples A to E.

Application Example A

70 Parts of chemically bleached sulphite cellulose of pinewood and 30 parts of chemically bleached sulphite cellulose of birchwood are ground in a hollander in 2000 parts of water. 0.2 Part of the dyestuff of Example 1 (in acid addition salt form) are sprinkled into this mass, or 2.0 parts of the liquid dye preparation according to Example 1 are added. After mixing for 20 minutes, paper is produced therefrom. The absorbent paper thus obtained is dyed reddish blue. The waste water is practically colourless.

Application Example B 0.3 Part of the dyestuff powder of Example 1 (in acid addition salt form) is dissolved in 100 parts of hot water and cooled to room temperature. The solution is added to 100 parts of chemically bleached sulphite cellulose which have been ground in a hollander in 2000 parts of water. After thorough mixing for 15 minutes, sizing takes place in the usual way with rosin size and aluminium sulphate. Paper which is produced from this material has a reddish blue shade and exhibits good properties with respect to waste water colouration as well as light- and wet fastnesses.

Application Example C

An absorbent length of unsized paper is drawn through a dyestuff solution of the following composition at 40°–50°:

0.3 part of the dyestuff of Example 1 (as acid addition salt) or 3 parts of the liquid dye preparation according to Example 1, 0.5 part of starch, and 99.2 parts (96.5 parts) of water.

The excess dye liquor is squeezed out through two rollers. The dried length of paper is dyed reddish blue.

Similarly, the dyestuffs of Examples 2 to 24 or a liquid-aqueous dyeing preparation thereof may be used to dye paper in accordance with the method described in Application Examples A to C. The paper dyeings thus obtained have a blue shade and show good general fastness properties.

Application Example D 0.2 Part of the dyestuff of Example 1 in acid addition salt form is dissolved at 40° in 4000 parts of demineralised water. 100 Parts of pre-moistened cotton fabric are added to the bath which is heated to boiling temperature over the course of 30 minutes. The bath is kept at the boil for one hour, and the water that evaporates is continuously replaced. The dyed fabric is then removed from the liquor, rinsed with water and dried. The dyestuff absorbs practically quantitatively onto the fibres; the dyebath is approximately colourless. A reddish blue cotton dyeing is obtained which show good light- and wet-fastness properties.

Similarly, the dyestuffs of Examples 2 to 24 may be employed to dye cotton in accordance with the method described in Application Example D.

Application Example E

100 Parts of freshly tanned and neutralised chrome grain leather are drummed for 30 minutes in a vat containing a dye liquor of 250 parts of water at 55° and 0.5 part of the dyestuff of Example 1 in acid addition salt form, and are treated in the same bath for a further 30 minutes with 2 parts of an anionic fat liquor based on sulphonated train oil. The leathers are dried and finished in the usual way. An evenly dyed leather in a reddish blue shade is obtained.

Similarly, the dyestuffs of Examples 2 to 24 can be used to dye leather in accordance with the above method.

Further low-affinity, vegetable-retanned leathers may similarly be dyed according to known methods.

What is claimed is:

1. A compound of formula I

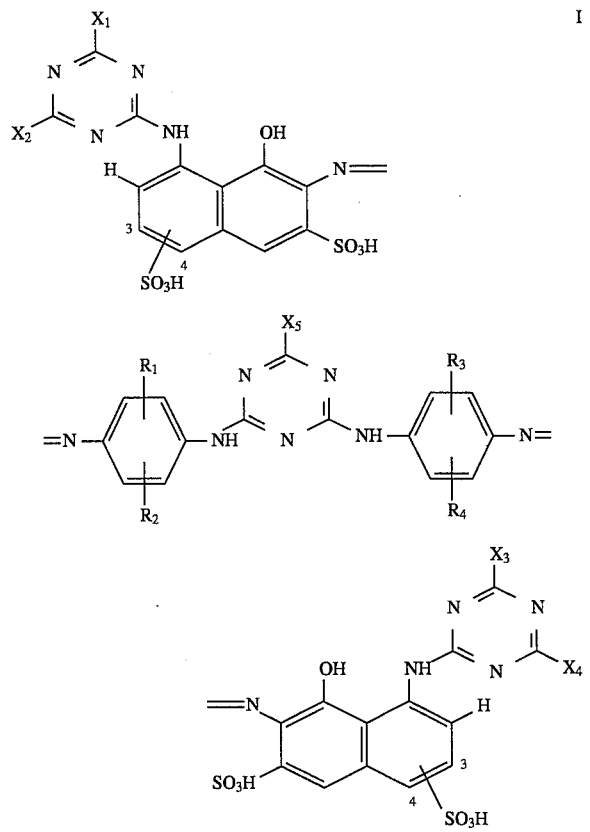

which is in an internal and/or external salt form, in which each of $R_1$ to $R_4$ is independently hydrogen, halogen, hydroxy, $C_{1-4}$alkyl, $C_{1-4}$alkoxy, —NHCOC$_{1-4}$alkyl or —NHCONH$_2$, each of $X_1$ to $X_4$ is independently an aliphatic, cycloaliphatic or heterocyclic amino group containing at least two nitrogen atoms, with the proviso that each of these amino groups bears a protonatable nitrogen atom or quaternary ammonium ion, and at least one of these amino groups bears a primary amino group, and $X_5$ is an aliphatic, cycloaliphatic or heterocyclic amino group containing at least two nitrogen atoms one of which is a protonatable nitrogen atom or quaternary ammonium ion, or an aromatic diamino group of which the terminal amino group is substituted by

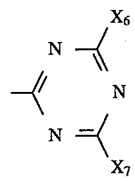

in which each $X_6$ and $X_7$ is independently an aliphatic, cycloaliphatic or heterocyclic amino group which contains at least two nitrogen atoms one of which is a protonatable nitrogen atom or a quaternary ammonium ion, with the proviso that the sum of the protonatable amino groups and quaternary ammonium groups present in $X_1$ to $X_5$ exceeds the number of the sulpho groups by at least one and further with the proviso that at least two of $X_1$ to $X_4$ contain a primary amino group.

2. A compound according to claim 1, in which the substituents of the phenyl rings $R_1$ and $R_2$ as well as $R_3$ and $R_4$ are in a para-position to each other according to the formula

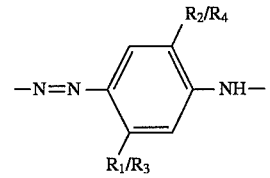

in which each $R_1$ and $R_3$ is $R_{1a}$ and $R_{3a}$, where each $R_{1a}$ and $R_{3a}$ is independently hydrogen, methyl, methoxy, —NHCOCH$_3$ or —NHCONH$_2$, and each $R_2$ and $R_4$ is $R_{2a}$ and $R_{4a}$, where each $R_{2a}$ and $R_{4a}$ is independently hydrogen, methyl or methoxy.

3. A compound according to claim 2, in which each $R_2$ and $R_3$ is independently hydrogen, methyl or methoxy, and $R_2$ and $R_4$ are both hydrogen.

4. A compound according to claim 1, in which each $X_1$ to $X_7$ is independently a radical

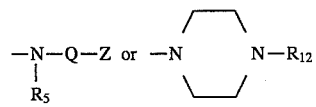

in which $R_5$ is hydrogen or $C_{1-4}$alkyl,

Q is $C_{2-6}$alkylene, $C_{3-6}$alkylene substituted by one or two hydroxy groups, or $C_{4-6}$alkylene which is interrupted by —O—, —S— or —N(R$_5$) —, and Z is —NR$_6$R$_7$ or —⊕NR$_8$R$_9$R$_{10}$ in which each R$_6$ and R$_7$ is independently hydrogen; $C_{1-6}$alkyl; $C_{2-6}$alkyl monosubstituted by hydroxy, $C_{1-4}$alkoxy or cyano; phenyl; phenyl substituted by one to three substituents selected from halogen, $C_{1-4}$alkyl and $C_{1-4}$alkoxy; phenyl($C_{1-4}$alkyl); phenyl($C_{1-4}$alkyl) the phenyl ring of which is substituted by one to three substituents selected from halogen, $C_{1-4}$alkyl and $C_{1-4}$alkoxy; $C_{5-6}$cycloalkyl or $C_{5-6}$cycloalkyl substituted by one to three $C_{1-4}$alkyl groups; or —NR$_6$R$_7$ forms a pyrrolidine- , piperidine- or morpholine ring or a ring

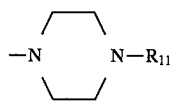

in which $R_{11}$ is hydrogen, $C_{1-4}$alkyl or $C_{2-4}$alkyl monosubstituted by hydroxy or amino, each $R_8$ and $R_9$ is independently $C_{1-6}$alkyl; $C_{2-6}$alkyl monosubstituted by hydroxy, $C_{1-4}$alkoxy or cyano; phenyl; phenyl substituted by one to three substituents selected from halogen, $C_{1-4}$alkyl and $C_{1-4}$alkoxy; phenyl($C_{1-4}$alkyl); phenyl($C_{1-4}$alkyl) the phenyl ring of which is substituted by one to three substituents selected from halogen, $C_{1-4}$alkyl and $C_{1-4}$alkoxy; $C_{5-6}$cycloalkyl or $C_{5-6}$cycloalkyl substituted by one to three $C_{1-4}$alkyl groups, and $R_{10}$ is $C_{1-4}$alkyl or benzyl, or —⊕$NR_8R_9R_{10}$ forms a ring

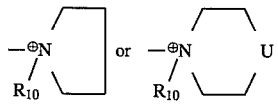

in which U is —$CH_2$—, —O— or —$N(R_{11})$—, or a pyridinium group which is unsubstituted or substituted by one or two methyl groups, with the proviso that the positive charge of each —⊕$NR_8R_9R_{10}$ is independently balanced by the negative charge of $SO_3^{\ominus}$ in the compounds of formula I to form an internal salt, or by An$^{\ominus}$ which is an external non-chromophoric anion, and $R_{12}$ is $C_{2-4}$alkyl monosubstituted by amino or hydroxy.

5. A compound according to claim 4, in which each $X_1$ to $X_4$ is $X_{1d}$ to $X_{4d}$, where each $X_{1d}$ to $X_{4d}$ is independently —NH—$(CH_2)_n$—$NR_{6d}R_{7d}$,

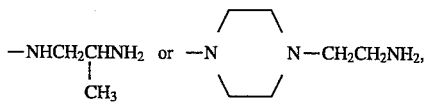

and $X_5$ is $X_{5c}$, where $X_{5c}$ is independently —NH—$(CH_2)_n NR_{6d}R_{7d}$, in which n is 2 or 3, and both $R_{6d}$ and $R_{7d}$ are the same and are methyl or ethyl.

6. A compound according to claim 1, which corresponds to formula Ia

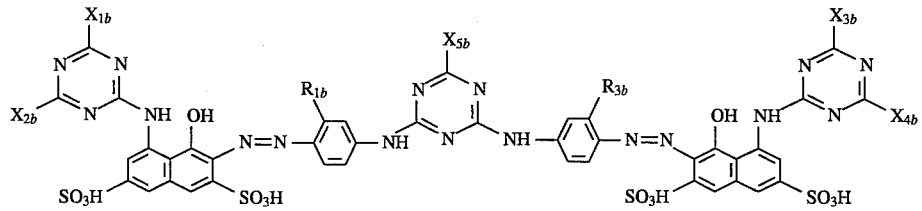

or an internal and/or external salt thereof, in which each $R_{1b}$ and $R_{3b}$ is independently hydrogen, methyl or methoxy, each of $X_{1b}$ to $X_{4b}$ is independently —NH—$Q_b Z_b$ or

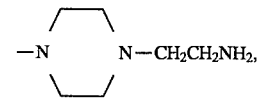

in which $Q_b$ is —$(CH_2)_n$—,

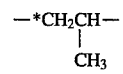

or —$(CH_2)_2$—NH—$(CH_2)_2$—, wherein n is 2 or 3 and the marked carbon atom is attached to —NH—; and $Z_b$ is —$NR_{6b}R_{7b}$ or —⊕$NR_{8a}R_{9a}R_{10a}$, wherein $R_{6b}$ and $R_{7b}$ are the same and are hydrogen, methyl, ethyl or 2-hydroxyethyl, or —$NR_{6b}R_{7b}$ is piperidino, morpholino or

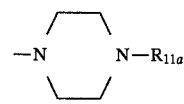

with $R_{11a}$ being hydrogen, methyl, 2-hydroxyethyl or 2-aminoethyl; $R_{8a}$ and $R_{9a}$ are the same and are methyl or ethyl, and $R_{10a}$ is methyl, ethyl or benzyl, or —⊕$NR_{8a}R_{9a}R_{10a}$ is a pyridinium group which is unsubstituted or substituted by one or two methyl groups, and $X_{5b}$ is —NH—$(CH_2)_n$—$Z_b'$ wherein n is 2 or 3 and $Z_b'$ has one of the significances of $Z_b$ above but independent thereof, with the exception of —$NH_2$;

with the proviso that (i) at least two of $X_{1b}$ to $X_{4b}$ are independently

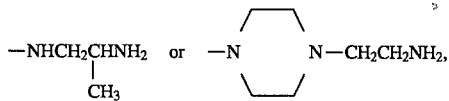

and (ii) the positive charge of each —⊕$NR_{8a}R_{9a}R_{10a}$ is independently balanced by the negative charge of $SO_3^{\ominus}$ in a compound of formula Ia to form an internal salt, or by An$^{\ominus}$ which is an external non-chromophoric anion.

7. A compound according to claim 6, in which $X_{1b}$ to $X_{4b}$ are $X_{1d}$ to $X_{4d}$, where each $X_{1d}$ to $X_{4d}$ is independently —NH—$(CH_2)_n$—$NR_{6d}R_{7d}$,

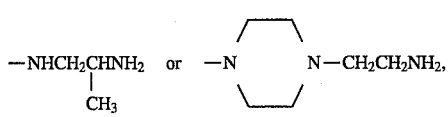

in which n is 2 or 3 and $R_{6d}$ and $R_{7d}$ are the same and are methyl or ethyl; and $X_{5b}$ is $X_5c$, where $X_{5c}$ is —NH—$(CH_2)_n$—$NR_{6d}$ and $R_{7d}$, in which n, $R_{6d}$ and $R_{7d}$ are as defined above but independent thereof.

8. A compound according to claim 6, in which $R_{1b}$ and $R_{3b}$ are both hydrogen.

9. A compound according to claim 1 wherein $X_1$ and $X_2$ contain a primary amino group.

10. A compound according to claim 1 wherein $X_3$ and $X_4$ contain a primary amino group.

11. A compound according to claim 1 wherein $X_1$, $X_2$, $X_3$ and $X_4$ each contain a primary amino group.

12. A liquid-aqueous dyeing preparation stable in storage, containing a compound of formula I as defined in claim 1, in water-soluble salt form.

13. A process for dyeing or printing cationically dyeable materials comprising applying to the material a compound according to claim 1 in water-soluble salt form.

14. A process according to claim 13, wherein the dyeable material is a hydroxy group- or nitrogen-containing organic substrate.

15. A process according to claim 14, wherein the substrate is paper.

* * * * *